Jan. 23, 1968 J. H. WILSON 3,365,085
PIPE HAULING AND DISPENSING APPARATUS
Filed Oct. 4, 1965 6 Sheets-Sheet 4
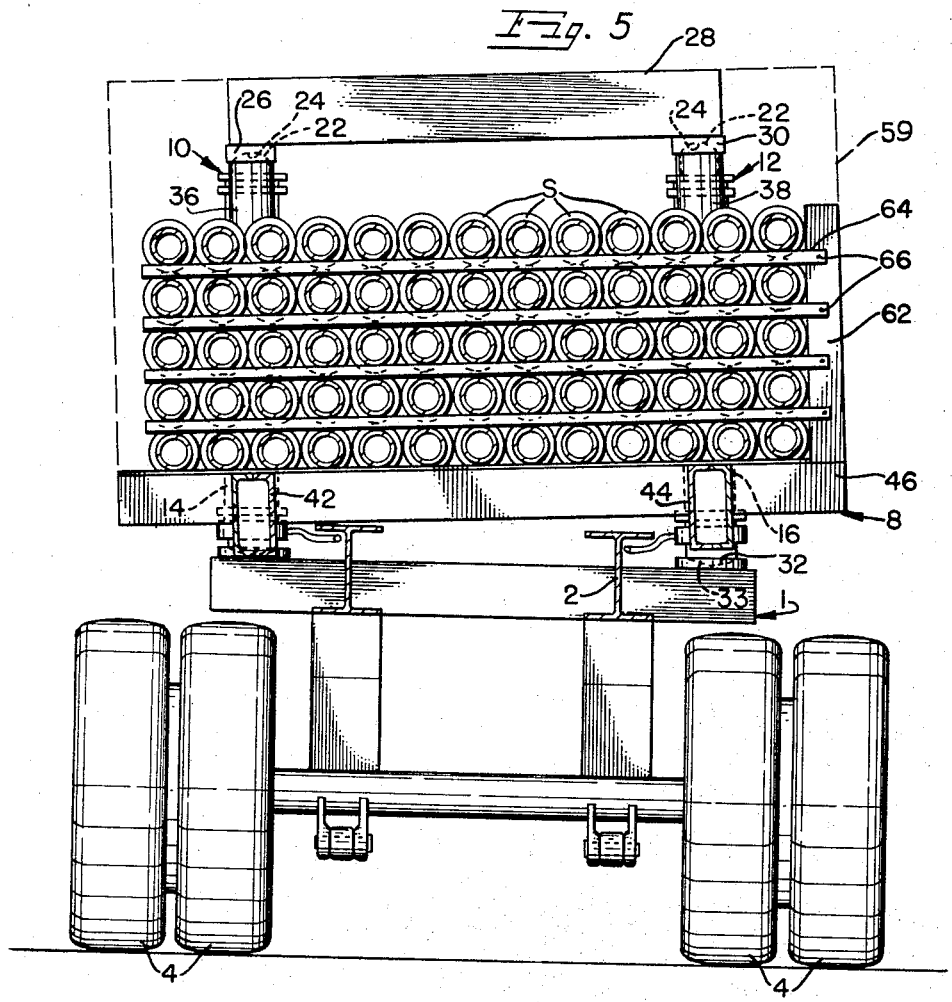
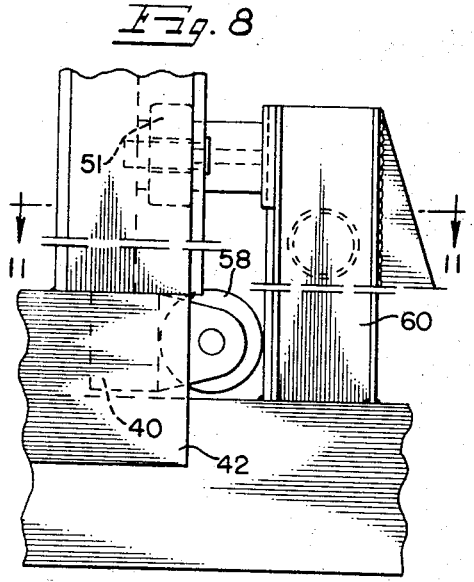
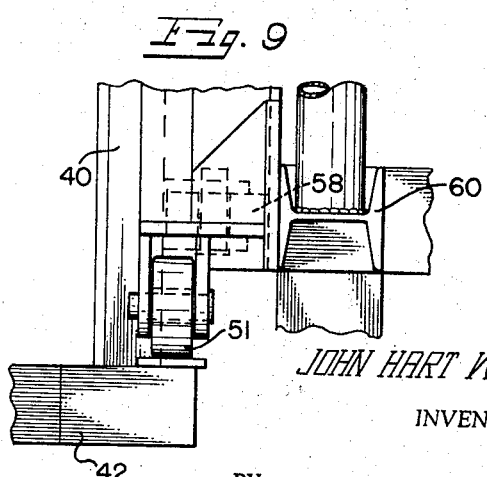
JOHN HART WILSON
INVENTOR.
BY
Wayland D. Keith
HIS AGENT Jan. 23, 1968  J. H. WILSON  3,365,085
PIPE HAULING AND DISPENSING APPARATUS
Filed Oct. 4, 1965  6 Sheets-Sheet 5

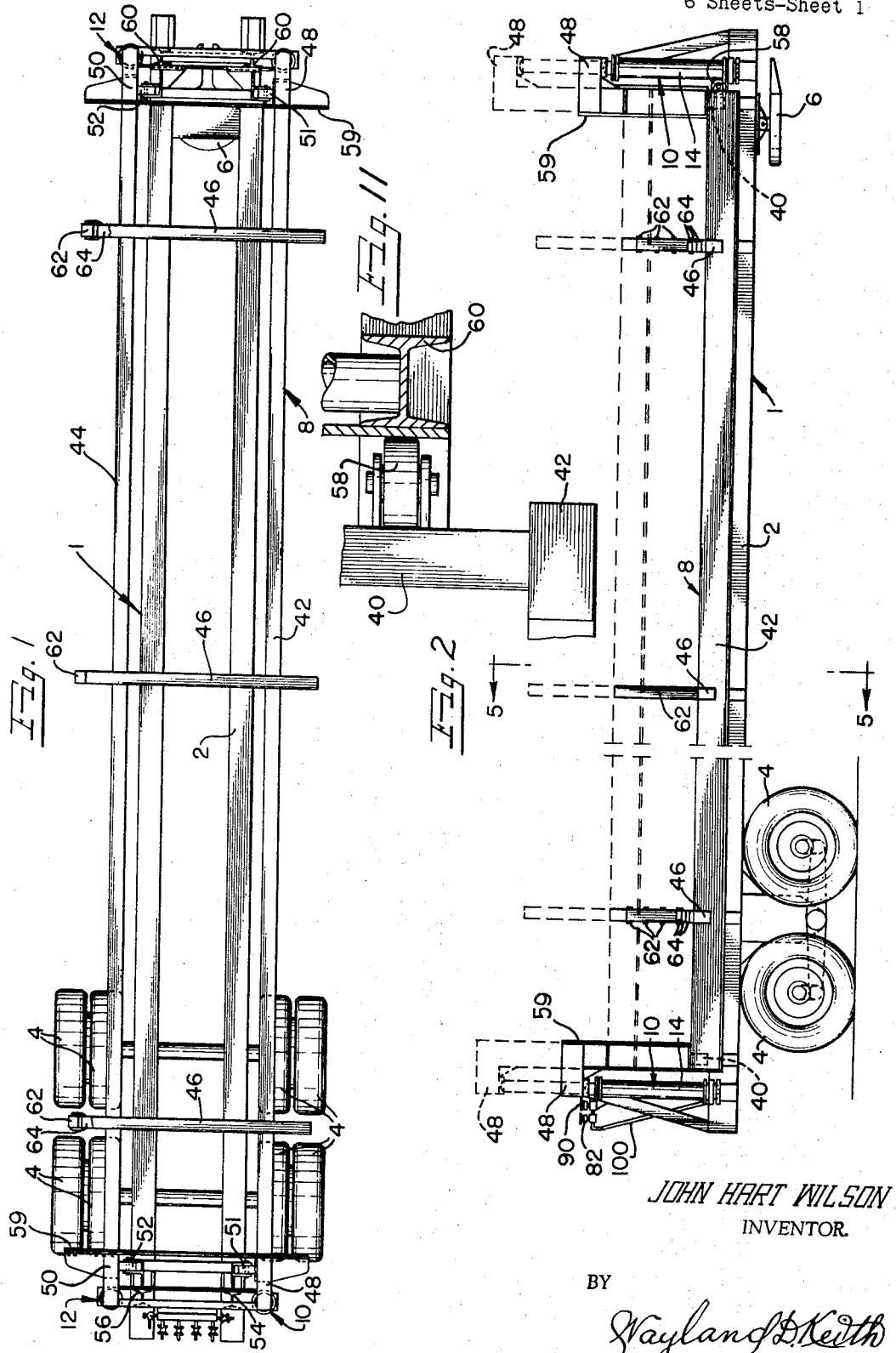

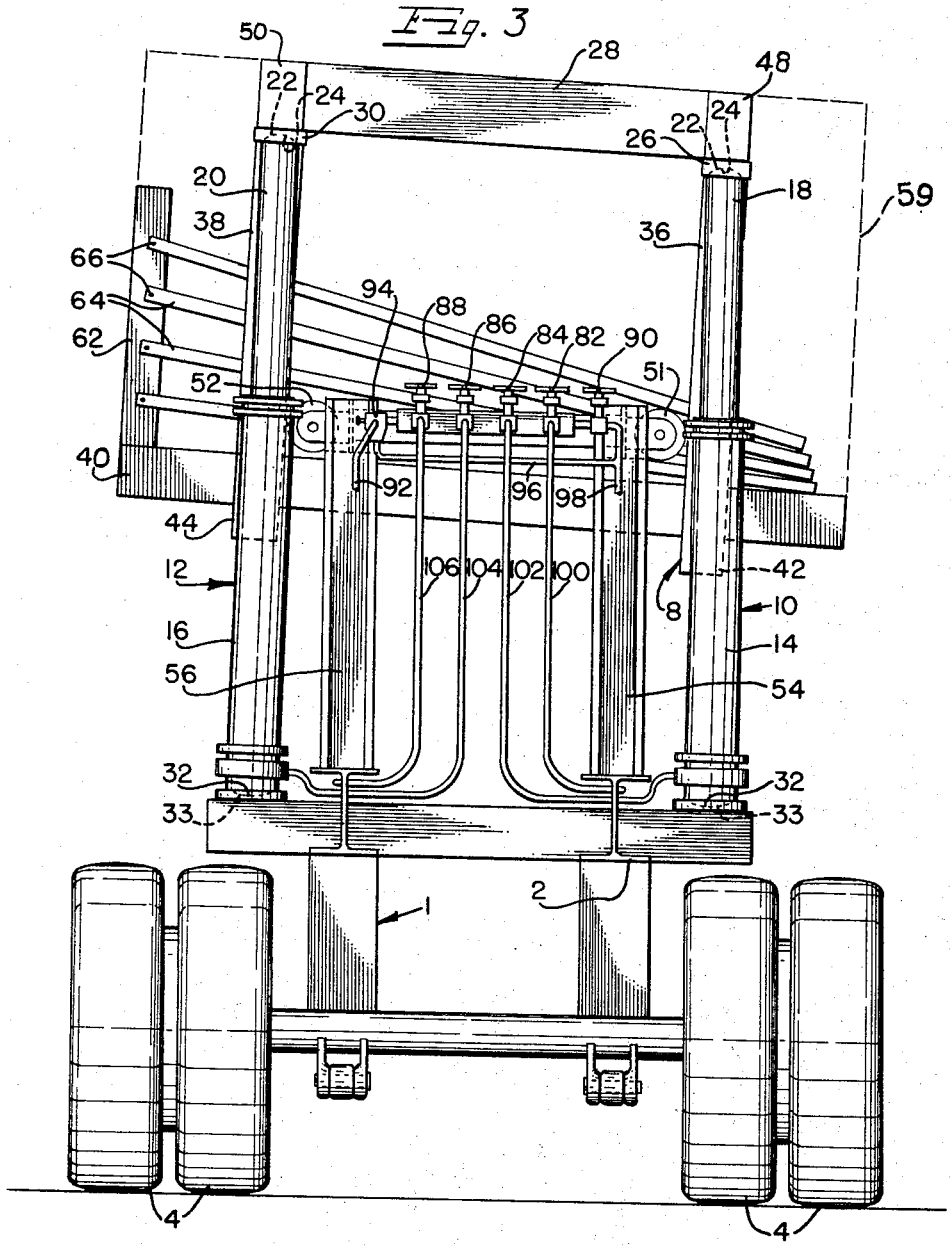

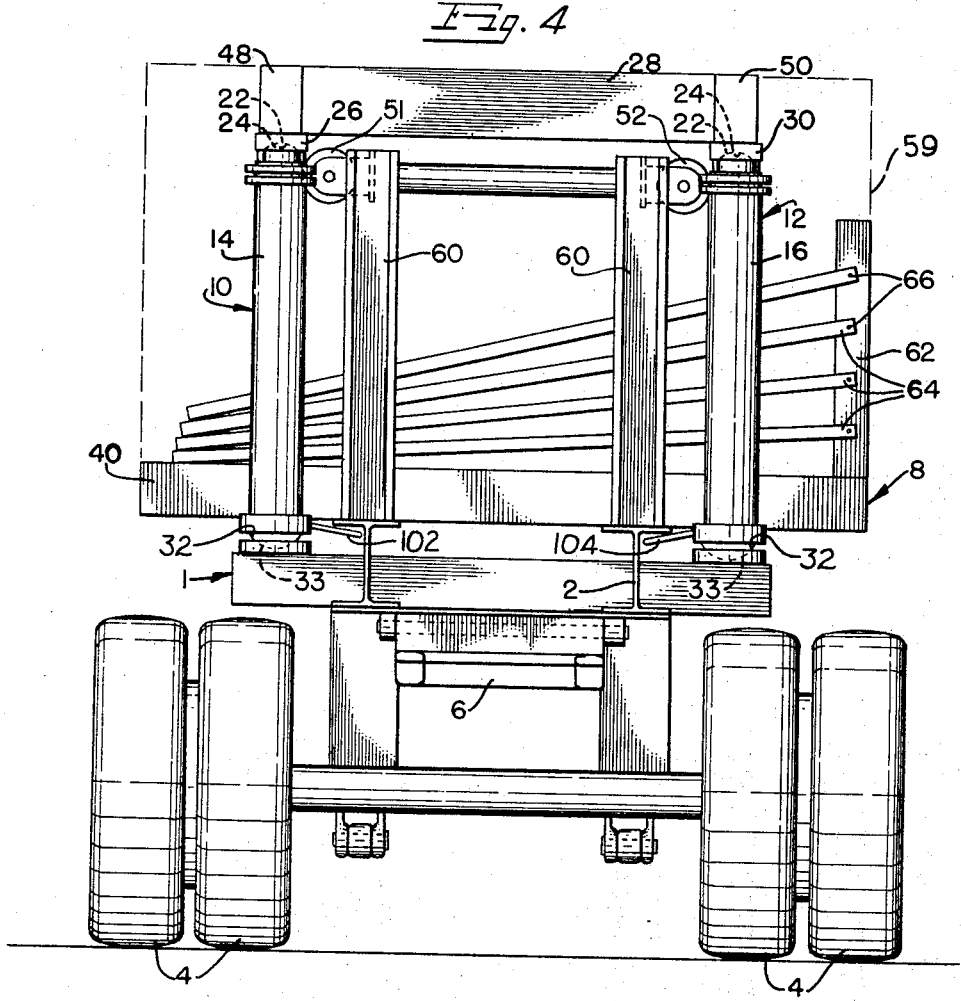

JOHN HART WILSON
INVENTOR.

BY
Wayland D. Keith
HIS AGENT

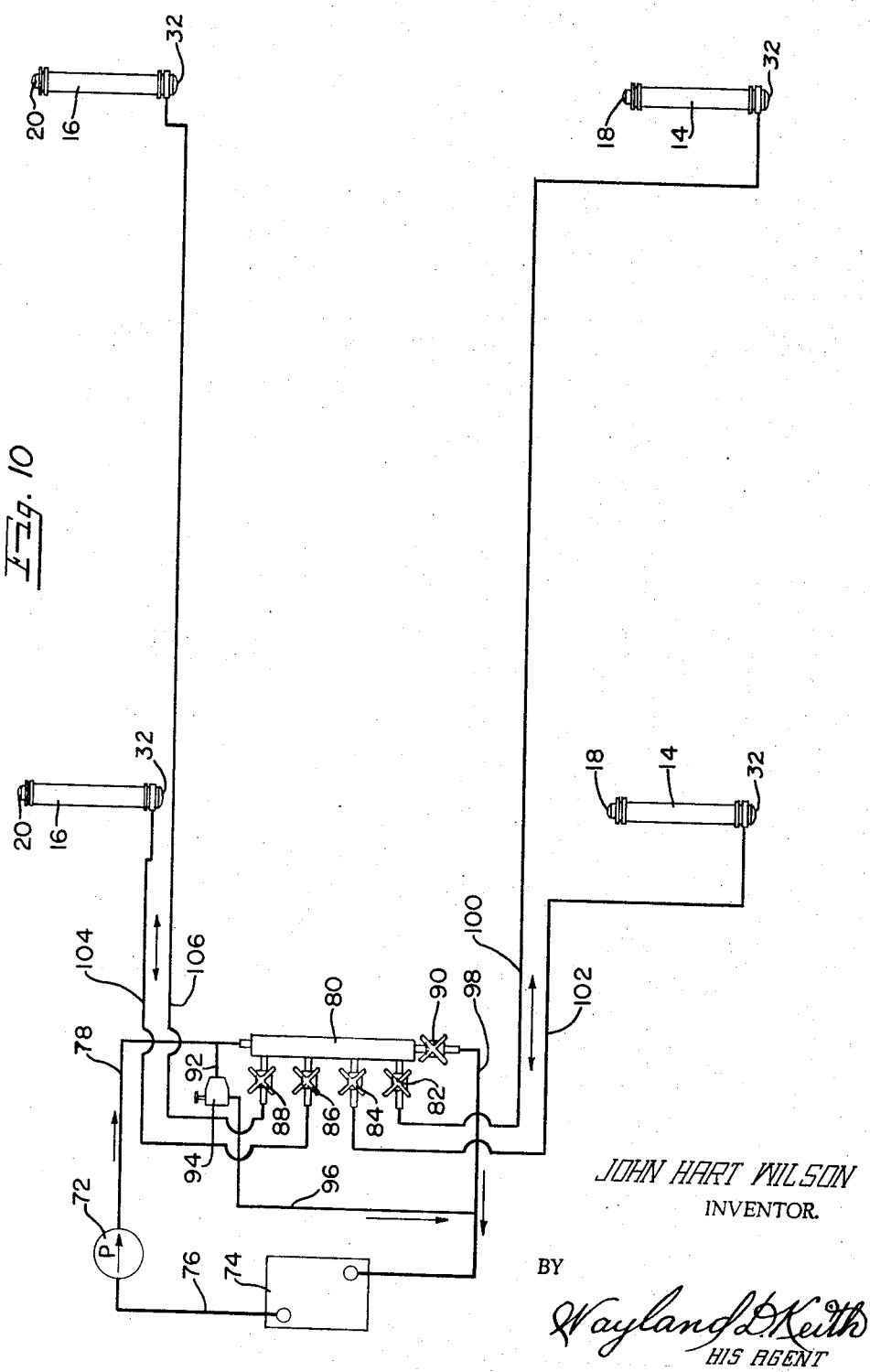

United States Patent Office 3,365,085
Patented Jan. 23, 1968

3,365,085
PIPE HAULING AND DISPENSING APPARATUS
John Hart Wilson, c/o Wilson Manufacturing Co., P.O. Box 1031, Wichita Falls, Tex. 76307
Filed Oct. 4, 1965, Ser. No. 492,580
9 Claims. (Cl. 214—502)

ABSTRACT OF THE DISCLOSURE

A vehicle for hauling pipe, drill stem, and the like, wherein the pipe may be rolled onto spacers on the vehicle to enable multiple tiers of pipe to be loaded and hauled, and which may be dispensed by angulating the spacers, so each tier may be selectively dispensed without manual labor. Provision is made for selectively elevating any corner or end of the pipe receiving body or rack to properly level the pipe receiving body or rack and to subsequently raise either side thereof to angulate the spacers, either to dispense the pipe from the body or rack, or, to receive the pipe or drill stem thereonto. Provision is also made to elevate the entire body at the proper angulated position to enable dispensing the pipe or drill stem therefrom or for receiving it thereonto.

---

This invention relates to pipe loading, hauling and dispensing vehicles and more particularly to a pipe loading, hauling and dispensing semi-trailer which will enable drill pipe and the like to be transported from one location to another, and when on location, the drill pipe may be dispensed onto a pipe conveyor or onto a platform, whereby it may be easily directed into position to be picked up by the elevators of a hoisting system of a drilling rig, and directed from the drilling rig back onto the conveyor and onto the pipe hauling vehicle, with little or no manual labor being required.

The present invention is so constructed that one side of the body or rack of the trailer carrying the pipe may be elevated so as to enable the rolling of the pipe towards pipe or drill stem positioner device or onto a platform. The pipe is originally loaded in tiers so that after one tier has been unloaded, subsequent tiers may be unloaded either at the same level or at different levels in accordance with the arrangement of jack means interposed between the chassis of the vehicle and the body or rack on which the pipe or drill stem is racked.

One or more trailers, preferably two, may be used in connection with a rotary drilling rig in such manner that the pipe may be dispensed uniformly onto a drill stem and pipe positioner device to enable the pipe to be moved or conveyed to a point where it may be picked up by the elevators of the hoisting system of the rotary drilling rig.

While it is advantageous to use the pipe trailer with a drill stem and pipe positioner device, as shown in my application filed Oct. 4, 1965, Ser. No. 492,581, now Patent No. 3,315,822, issued Apr. 25, 1967, it is not absolutely necessary that such pipe positioner device be utilized.

When the well has been drilled to such depth that the drill pipe needs to be removed, in order to replace a drill bit, or for other purposes, the pipe is withdrawn and directed onto a dolly such as used on the drill stem and pipe positioner device, shown in the co-pending application, or the pipe may be moved outward by means of a dolly on a platform, or by other means and dispensed onto divider strips on the rack of the trailer, and with one side of the trailer receiving the pipe raised to a higher level than the opposite side thereof, the drill pipe will roll into racked relation, whereupon additional dividers may be used to enable additional tiers of pipe to be stacked one above the other until all the pipe is removed from the bore hole with a minimum of labor being required to so load the pipe onto the trailer.

An object of this invention is to provide a vehicle for hauling pipe, drill stem and the like, from place to place, with the pipe positioned on the trailer in such manner that pipe or drill stem may be used directly from the trailer without having to unload the pipe or drill stem from the trailer onto a rack for use.

Still another object of the invention is to provide a vehicle frame on which a pipe receiving body or rack is located and wherein jacks are provided intermediate the vehicle frame and the body to enable either side of the pipe rack or body to be raised or lowered so as to provide angulated pipe dividers or supports on which to receive the pipe or drill stem thereonto when positioned at one angle and to dispense the pipe or drill stem therefrom when the dividers or supports are positioned at another angle.

Another object of the invention is to provide a combination pipe hauling trailer and pipe dispenser to obviate the necessity of unloading the drill stem or pipe onto racks preparatory to using the drill stem.

Still another object of the invention is to provide a pipe holding and dispensing vehicle, whereupon the pipe holding body or frame may be elevated selectively to various heights.

Still another object of the invention is to provide a vehicle frame having independent fluid actuated jacks mounted thereon near each corner thereof so as to enable the selective raising of any corner of the vehicle body which is mounted on a wheeled frame.

With these objects in view and others which will become manifest as the description proceeds, reference is to be had to the accompanying drawings in which like reference characters designate like parts in the several views thereof, in which:

FIG. 1 is a top plan view of a vehicle frame, such as a semi-trailer, and showing a pipe receiving body or rack thereon;

FIG. 2 is a side elevational view of the vehicle frame, such as a semi-trailer as shown in FIG. 1, with parts broken away and shortened and showing the pipe or drill stem loading frame in transport position in full outline, and showing the body or frame in dashed outline in raised position;

FIG. 3 is an enlarged rear elevational view of the pipe hauling and dispensing trailer, showing the control valves and fluid actuated jacks associated therewith, and showing the pipe hauling body or rack in position to dispense pipe therefrom;

FIG. 4 is an enlarged front elevtaional view of the vehicle frame or trailer, showing the jacks in lowered position, this being the normal transport position;

FIG. 5 is a sectional view, on an enlarged scale, taken on line 5—5 of FIG. 2, looking in the direction indicated by the arrows, showing one side of the body or pipe rack in raised position to dispense the pipe or drill stem therefrom;

FIG. 8 is an enlarged, fragmentary elevational view of the roller and guide system for a corner of the body or pipe hauling rack, with parts broken away and shortened;

FIG. 9 is a fragmentary bottom plan view of a roller and guide system for one of the corners of the pipe hauling and dispensing device;

FIG. 10 is a diagrammatic view of the hydraulic or fluid system used in controlling the position of the pipe hauling body or rack with respect to the chassis of the vehicle frame; and FIG. 11 is a sectional view taken on the line 11—11 of FIG. 8, looking in the direction indicated by the arrows.

Figure 6:
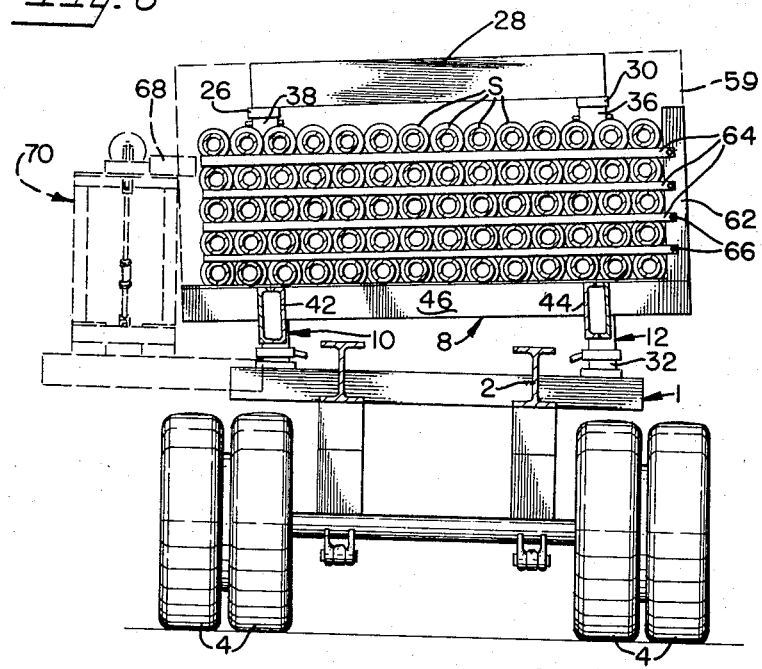
FIG. 6 is a view similar to FIG. 5, but on a reduced scale, showing a drill stem and positioner pipe device in dashed outline secured to the side of the chassis of the vehicle frame.

With more specific reference to the drawings, the numeral 1 designates generally a vehicle such as a semi-trailer. The vehicle frame comprises a chassis 2 having wheels 4 thereon, with the usual fifth wheel 6. A body or rack 8 is mounted on the chassis 2 and it is movable in a substantially upright plane by pairs of fluid actuated jacks 10 and 12, a pair of such jacks being arranged on each longitudinal side of trailer 1. The jacks preferably have the respective cylinders 14 and 16 thereof mounted in an upright position with respective plungers 18 and 20 movable in an upright plane.

A transverse beam 28 is mounted on each end of the body or rack 8 and has support members 26 on the end of each of the transverse beams 28, so said support members 26 will be on the same longitudinal side of the body or rack 8. Similar support members 30 are positioned on the opposite ends of transverse beams 28. Each of the support members 26 and 30 has a rounded or arcuate recess 24 formed therein, each of which recesses complementally receives the respective rounded or arcuate surface 22 which is formed on the respective upper ends of plungers 18 and 20.

The plunger 20, of each cylinder 16 of the jacks, has a rounded end 32 thereon, each of which complementally seats in a recess 24, in the respective support members 30 and 26.

By having the ends 22 of plungers 18 and 20 rounded, and complementally seating in recesses 24 in support members 26 and 30, respectively, and by having the lower ends 32 of the cylinders 14 and 16 rounded and complementally seating in seats 33, which are formed on the trailer chassis 2, and with the respective cylinder-plunger units positioned between the chassis 2 and the body or rack 8, either side of the body or rack may be raised or lowered with respect to the chassis 2, or both sides of the body or rack 8 may be raised simultaneously. By elevating either longitudinal side of the body or rack 8, the pipe support racks or divider strips 64 may be so angulated, that, when in one position, the pipe or drill stem will roll onto the body or racks 8 in side by side position, the opposite position of the divider strips will enable the pipe or drill stem to roll onto the pipe positioner, preparatory to use in connection with a rotary drilling rig.

Support members 36 and 38 are secured, at their upper ends, to the outer ends of the respective transverse beams 28, the lower ends of which support members are secured to the respective transverse members 40 on body or rack 8, one of which members 40 is positioned near each end of the chassis 2 of the vehicle. Longitudinal sills 42 and 44 have transverse members 46 secured thereto intermediate the ends thereof, as will best be seen in FIGS. 1 and 2.

It is preferable to have the transverse beams 28 mounted on the respective distal ends of outstanding arms 48 and 50 so that the respective jacks 10 and 12 will be positioned under the respective ends of arms 48 and 50. The downwardly depending support members 36 and 38 have plane faces on the respective adjacent sides to form a surface on which guide rollers 51 and 52 roll, as the jacks 10 and 12 raise or lower the body or rack 8 with respect to chassis 2. The chassis 2 has upstanding posts 54 and 56 on which guide rollers 51 and 52 are mounted, near the top thereof. The guide rollers 51 and 52 are not fitted in close relation, thereby enabling a limited angular shifting of the body or rack 8, to enable the pipe to be dispensed therefrom or to be received thereonto in accordance with the angularity of transverse members 40, as will best be seen in FIGS. 6 and 7. A plate 59 is secured to and extends between each pair of downwardly depending support members 36 and 38, which members are positioned at the respective ends of elongated body or rack 8, thereby to prevent undue longitudinal movement of drill stem or pipe S.

In addition to guide rollers 51 and 52, further guide rollers 58 are mounted on the lower side of body or rack 8, and roll in guided relation on the inner face of upright posts 60, as will best be seen in FIGS. 2, 8, 9, and 11.

Upright standards 62 rise from the respective transverse members 46 and each end standard 62 has a series of divider strips 64 which are pivoted thereon, which divider strips 64 receive layers of pipe or drill stem thereon, after the first layer of pipe or drill stem has been placed on transverse members 46. The divider strips 64 are each pivotally mounted by pivot pins 66 to the respective upright standards 62 on each end of body or rack 8, and after a tier of pipe has been dispensed from one of the series of divider strips 64, the strips of the series may be raised and secured in upright position (not shown) to enable the subsequent layers of pipe to be unloaded, until the last tier of pipe is unloaded from transverse members 46 of the body or rack 8.

Figure 7:
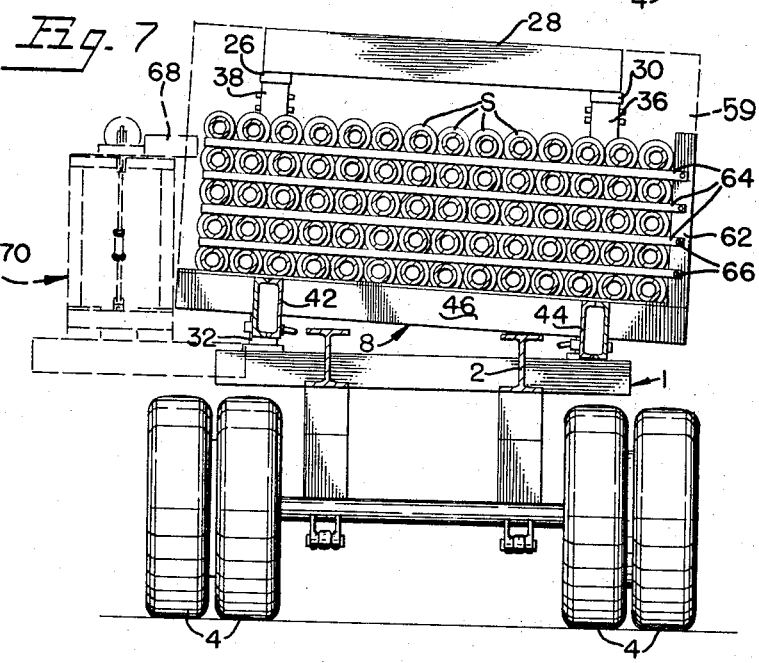
FIG. 7 is a view similar to FIG. 6, but with the side of the body or pipe rack raised so as to position the pipe support members or dividers to receive the pipe or drill stem from the positioner thereonto.

With the pipe rack adjusted in position, as shown in FIG. 7, the loading of pipe or drill stem S may progress until the trailer is loaded. With the trailer loaded, all plungers 18 and 20 are lowered until the body or rack 8 attains the position as shown in full outline, FIG. 2, and as shown in FIG. 4. When the vehicle or semi-trailer is moved to the desired location, the plungers 18 and 20 may be utilized to raise the drill stem or pipe to a level where the upper surface of the upper series of divider strips 64 will be substantially level with the upper surface of outwardly extending support bar 68 on pipe positioner 70, as shown in FIG. 6, when a pipe positioner is used, and then the pipe is allowed to roll against a stop on the pipe positioner, as shown in my co-pending application, and as the pipe or drill stem is used from the pipe positioner, additional lengths of drill stem will automatically roll down the angularly positioned divider strips 64 until a tier of pipe is used, whereupon, the divider strips 64, of one series of strips, are raised so as to be out of the way when dispensing additional pipe, whereupon, all plungers 18 and 20, of jacks 10 and 12 are raised to align the upper surface of the next series of divider strips so that they will be even with the upper surface of the outwardly extending support bar 68, whereupon, successive lengths of pipe are dispensed onto the pipe positioner until all the pipe is dispensed from the trailer.

To load the trailer with drill stem or pipe from the pipe positioner 70, the transverse members 40 and 46 are moved upwardly, until the upper surface thereof is level with the support member 68. However, the plunger 18 of jack 10 is raised to a higher elevation than the plunger 20 of jack 12. This will cause an angular position to be assumed by the divider strips 64, as is best illustrated in FIG. 7, whereupon, drill stem or pipe is rolled of successive layers onto strips 64 from pipe positioner 70 until the trailer is loaded.

*Hydraulic system*

A hydraulic system, associated with the pipe hauling and dispensing apparatus, is shown diagrammatically in FIG. 10, which hydraulic system comprises a pumping and conduit system which selectively directs hydraulic fluid to hydraulic rams, and a manifold system enables the selective release of any particular ram or rams, to selectively raise or lower selected portions of a pipe rack or body with respect to the chassis of the trailer.

The hydraulic system comprises a pump 72, which withdraws hydraulic fluid from a reservoir 74 by suction conduit 76, and directs the hydraulic fluid out through discharge conduit 78 into a manifold 80. However, if the valves 82, 84, 86, 88, and 90 of manifold 80 are closed, the hydraulic fluid will be directed through a branch conduit 92 and through pressure relief valve 94 into return conduit 96, thence back to the reservoir 74.

With valves 82, 84, 86 and 88 of the manifold 80 closed, and valve 90 thereof open, the hydraulic fluid will pass out through conduit 98 and thence return to reservoir 74. To selectively raise the hydraulic jacks or rams 10 and 12, the valves 82, 84, 86, and 88 are opened and the valve 90 is closed, whereupon, hydraulic fluid is directed out through the respective conduits 100, 102, 104, and 106. However, to selectively raise the plungers 18 of jacks 10, valves 82 and 84 are opened to direct hydraulic fluid, under pressure, into conduits 100 and 102, which will selectively raise one side of the rack or body 8. The raising of one side of the rack or body 8 will impart an angularity to transverse members 40 and 46, which will enable the pipe to be rolled toward the upright standards 62 until the several tiers of pipe are loaded onto the divider strips 64.

When it is desired to load pipe onto the trailer, it is preferable that plungers 18 in cylinders 14 and the plungers 20 in cylinders 16 be raised until the upper face of transverse members 40 and 46 of the rack or body 8 are level, on the receiving side, with outstanding support bars 68. However, it is preferable to lower plungers 20 sufficiently to angulate transverse members 40 and 46 so that pipe or drill stem S will roll toward upstanding standards 62 on the rack or body 8. However, when a full row of pipe or drill stem extends across the lower surface of transverse members 40 and 46, in side-by-side relation, a divider strip 64 is lowered and the plungers 18 and 20 are lowered by opening valve 90, and each of the valves 82, 84, 86 and 88 to exhausting hydraulic fluid from hydraulic cylinders or rams 10 and 12 until the plungers 18 and 20 have moved downward the desired amount, with the angulation of divider strips 64 being maintained so the pipe or drill stem will roll against upright standards 62. This is repeated until all of the pipe is withdrawn from the well and positioned on the body or rack by a pipe positioner or by a dolly, if a pipe positioner is not used.

When it is desired to remove the pipe from the body or rack 8, the upper face of the divider strips 64, adjacent the support bars 68 are positioned so that the pipe will roll off the divider strips 64 onto the support bar 68 of pipe positioner 70. With the ends of the uppermost divider strips 64, adjacent the respective support bars 68, hydraulic fluid is directed from pipe 72 through discharge conduit 78 into manifold 80, and with valve 90 closed and valves 86 and 88 open, hydraulic fluid, under pressure, is directed into hydraulic jacks 12, which will raise the plungers 20 thereof the desired amount, whereupon, the valves are closed, then hydraulic fluid will be by-passed through branch conduit 92, hydraulic relief valve 94, into return pipe 96, thence to the hydraulic sump or reservoir 74. If it is desired to hold the jacks 12 in this position, the valves 86 and 88 are closed, so hydraulic fluid will not be by-passed through manifold 80, upon opening valve 90.

After one tier of pipe or drill stem is unloaded from the upper divider strips 64, valve 90 is closed, and the valves 82, 84, 86 and 88 are opened, with valves 82 and 84 directing hydraulic fluid into conduits 100 and 102, respectively, to jacks 10, which will urge the plungers 18 thereof upward. The hydraulic fluid which is directed into the respective conduits 104 and 106 and to the cylinders of jacks 12 will urge plungers 20 thereof upward. With the plungers 18 and 20 in bearing relation with support members 26 and 30, the rack or body 8 will be raised the desired amount, whereupon, valves 82, 84, 86, and 88 are closed, which will hold the divider strips 64 and transverse members 40 and 46 in an angulated position to facilitate the unloading of the pipe or drill stem onto the pipe positioner 70. The sequence is repeated until all the pipe or drill stem is unloaded onto the pipe positioner, to be run into the well.

When it is desired to transport pipe from one well location to another, valves 82, 84, 86, 88 and 90 are opened, which will permit the plungers 18 and 20 to be retracted by exhausting the hydraulic fluid from the cylinders of jacks 10 and 12. This will lower the pipe rack or body into transport position, as shown in FIG. 4.

Having thus clearly shown and described the invention, what is claimed as new and desired to be secured by Letters Patent is:

1. A portable pipe hauling and dispensing apparatus, which apparatus comprises;
   (a) an elongated first frame,
      (1) wheels mounted near one end of said elongated first frame to support said frame for movement over the terrain,
   (b) an elongated second frame mounted on said elongated first frame and being movable vertically relative thereto, and being in substantial longitudinal alignment therewith,
   (c) a pair of support members secured to each end of said elongated second frame and extending upward therefrom,
      (1) a plate secured to each pair of said support members on adjacent faces thereof and extending therebetween, and extending outward substantially the full width of said elongated second frame and upward to a point near the upper end of said support members,
      (2) outwardly extending arms secured to each upper end of each said support member,
      (3) a transverse beam secured between ends of adjacent outstanding arms on each end of said second elongated frame,
   (d) a concave jack seat on each corner of said first elongated frame,
   (e) a concave jack support member mounted on the outer end of each outstanding arm on said second elongated frame,
   (f) a fluid actuated jack, having complementary convex base thereon, mounted on each said jack seat at each corner of said elongated first frame,
      (1) the upper end of each said jack being convex and adapted to seat in complementary relation with said concave seat of said jack support on the respective outstanding arms on said elongated second frame, which jacks are so positioned between said elongated first frame and said elongated second frame as to impart relative movement therebetween,
   (g) a source of fluid pressure,
   (h) conduits connected to said source of fluid under pressure and to the respective jacks, and
   (i) a valve in each said conduit to control fluid under pressure to the respective jacks to enable said elongated second frame to be moved with respect to said elongated first frame.

2. A portable pipe loading, hauling and dispensing apparatus, which apparatus comprises;
   (a) an elongated first frame,
   (b) an elongated second frame movably mounted on said elongated first frame and being substantially in alignment therewith,
      (1) said elongated second frame being rectangular, the ends of said rectangular frame being upright and closed,
      (2) one elongated side only of said rectangular second frame having at least one upright member thereon,
      (3) said elongated second frame being movable with respect to said first frame, substantially in an upright plane,
   (c) hydraulic jack means associated with each corner of said elongated first frame in hoisting relation, with the respective corners of said second elongated frame,
      (1) a hydraulic fluid pressure system connected in fluid communication with each said hydraulic jack means, (2) a plurality of hydraulic control valves within said hydraulic fluid system, one said valve being in valved communication with each said hydraulic jack means to selectively move at least a corner portion of said elongated second frame with respect to said elongated first frame, upon selective operation of each said hydraulic valve, and (3) said hydraulic jack means being universally mounted on said first frame to yield with respect to the vertical to permit universal angulation of said second frame with respect to said first frame.

3. A portable pipe loading, hauling and dispensing apparatus as defined in claim 2; wherein (a) upright guide means is positioned on one of said frames and complementary guide means is positioned on the other of said frames to guide said second frame with respect to said first frame throughout the entire upright movement of said second frame.

4. A portable pipe loading, hauling and dispensing apparatus, as defined in claim 3; wherein (a) said complementary guide means on one of said frames being rollers which are adapted to roll on said upright guide means on the other of said frames, upon relative movement between said first frame and said second frame.

5. A portable pipe hauling and dispensing apparatus which comprises;

(a) an elongated first frame,
 (1) wheels mounted near one end of said elongated first frame to support said elongated first frame for movement over the terrain, (b) an elongated second frame mounted on said elongated first frame and being movable relative thereto and being substantially in alignment therewith, (c) upright guide means positioned on one of said frames to guide relative movement between said first frame and said second frame, (d) a fluid actuated jack mounted on said first frame near each corner thereof, and being interposed between said elongated first frame and said elongated second frame to impart relative movement therebetween,
 (1) said respective ends of said jacks are rounded,
 (2) mountings on said elongated first frame and on said elongated second frame, which mountings are recessed to complementally receive the rounded ends of the respective jacks to enable a tilting action to be imparted to said second frame with respect to said first frame by moving the jacks on one longitudinal side only of said frame, (e) a source of fluid under pressure, (f) conduits connecting said source of fluid, under pressure, and said respective fluid actuated jacks, and (g) a valve in each said conduit to control fluid under pressure to said respective fluid actuated jacks so as to enable said elongated second frame to be moved with respect to said elongated first frame.

6. A portable pipe hauling and dispensing apparatus which comprises;

(a) an elongated first frame,
 (1) wheels mounted near one end of said elongated first frame to support said elongated first frame for movement over the terrain, (b) an elongated second frame mounted on said elongated first frame and being movable relative thereto and being substantially in alignment therewith, (c) upright guide means positioned on one of said frames to guide relative movement between said first frame and said second frame, (d) a fluid actuated jack mounted on said first frame near each corner thereof, and being interposed between said elongated first frame and said elongated second frame to impart relative movement therebetween, (e) a source of fluid under pressure, (f) conduits connecting said source of fluid, under pressure, and said respective fluid actuated jacks, (g) a valve in each said conduit to control fluid under pressure to said respective fluid actuated jacks so as to enable said elongated second frame to be moved with respect to said elongated first frame, (h) said elongated second frame has upright standards positioned, at spaced intervals, along one side thereof, (i) spaced apart divider strips pivotally mounted on said upright standards, along the length thereof, to receive layers of pipe thereon, and (j) said jack means being adapted to selectively raise a portion of said second frame, upon directing fluid under pressure, selectively, to certain of said fluid actuated jacks.

7. A portable pipe loading, hauling, and dispensing apparatus, which apparatus comprises;

(a) an elongated first frame,
 (1) wheels mounted near one end of said elongated first frame to support said elongated first frame for movement over the terrain, (b) an elongated second frame mounted on said elongated first frame and being movable relative thereto and being substantially in alignment therewith, (c) upright guide means positioned on said elongated first frame, (d) roller guide means mounted on said elongated second frame to guide said second frame relative to said first frame in loose rolling engagement with said upright guide means upon relative movement therebetween, (e) a fluid actuated jack mounted on said first frame near each corner thereof, and being interposed between said elongated first frame and said elongated second frame to impart relative movement therebetween, (f) a source of fluid under pressure, (g) conduits connecting said source of fluid under pressure and said respective fluid actuated jacks, (h) a valve in each said conduit to control fluid under pressure to said respective fluid actuated jacks so as to enable said elongated second frame to be moved with respect to said elongated first frame, (i) a downwardly depending guide means positioned on said elongated second frame, (j) roller guide means on said first frame and being in loose fitting, rolling engagement with said downwardly depending guide means on said second elongated frame to further guide one of said frames relative to the other of said frames upon relative movement between said elongated first frame and said elongated second frame, and (k) at least two sets of said roller guide means have the axes thereof horizontal and arranged at substantially a right angle to each other, so as to guide one of said elongated frames relative to the other of said elongated frames in a substantially upright movement and in a limited lateral movement.

8. A portable pipe loading, hauling, and dispensing apparatus, which apparatus comprises;

(a) an elongated first frame,
 (1) wheels mounted near one of said elongated first frame to support said elongated first frame for movement over the terrain, (b) an elongated second frame mounted on said elongated first frame and being movable relative thereto and being substantially in alignment therewith, (c) upright guide means positioned on one of said frames,
 (1) roller guide means mounted on the other of said frames to guide one of said frames relative to the other of said frames, upon relative movement therebetween, (d) a fluid actuated jack pivotally mounted on said first frame, near each corner thereof, and being universally interposed between said elongated first frame and said second elongated frame to impart relative movement therebetween, (e) a source of fluid under pressure, (f) conduits connecting said source of fluid under pressure and said respective fluid actuated jacks, (g) a valve in each said conduit to control fluid under pressure to said respective fluid actuated jacks so as to enable said elongated second frame to be moved with respect to said elongated first frame, and (h) each valve to control fluid to the respective fluid actuated jacks may be independently operated to selectively tilt a corner of said second elongated frame.

9. A portable pipe loading, hauling, and dispensing apparatus, which apparatus comprises;

(a) an elongated first frame,
   (1) wheels mounted near one end of said elongated first frame to support said elongated first frame for movement over the terrain, (b) an elongated second frame mounted on said elongated first frame and being movable relative thereto and being substantially in alignment therewith, (c) upright guide means positioned on one of said frames,
   (1) roller guide means mounted on the other of said frames to guide one of said frames relative to the other of said frames, upon relative movement therebetween, (d) a fluid actuated jack mounted on said elongated first frame near each corner thereof, (e) a source of fluid under pressure, (f) conduits connecting said source of fluid under pressure and said respective fluid actuated jacks, (g) a valve in each said conduit to control fluid under pressure to said respective fluid actuated jacks, (h) each end of said elongated second frame having upstanding support members secured thereto,
   (1) an outwardly extending arm on each said support member,
   (2) each said fluid actuated jack being positioned below one said outwardly extending arm on each said upstanding support member,
   (3) each said fluid actuated jack being adapted to impart relative movement between said elongated first frame and said respective outwardly extending arms on said support members, on said elongated second frame, to impart relative movement between said elongated first frame and said elongated second frame, and (i) an upright plate secured to said support members near each end of said plate.

References Cited

UNITED STATES PATENTS

| | | | |
|---|---|---|---|
| 3,145,865 | 8/1964 | Rogers | 214—512 |
| 2,831,588 | 5/1954 | Seed. | |
| 3,096,894 | 7/1963 | Proler et al. | 214—515 |
| 3,119,503 | 1/1964 | Herpich et al. | 214—512 |
| 3,254,776 | 6/1966 | Brown | 214—2.5 |
| 3,262,678 | 7/1966 | Hand | 214—515 |

GERALD M. FORLENZA, *Primary Examiner.*

ALBERT J. MAKAY, *Examiner.*